United States Patent [19]

Ikeda

[11] 4,433,600
[45] Feb. 28, 1984

[54] WORKPIECE LOCATING DEVICE FOR A CORNER SHEAR MACHINE

[75] Inventor: Chihiro Ikeda, Tatsukuchi, Japan

[73] Assignee: Takeda Machinery Works Company, Ltd., Ishikawa, Japan

[21] Appl. No.: 386,079

[22] Filed: Jun. 7, 1982

[51] Int. Cl.³ .............................................. B26D 7/01
[52] U.S. Cl. ........................................ 83/468; 83/522; 83/917; 144/217; 269/305; 269/319
[58] Field of Search ................. 83/468, 467, 522, 693, 83/917; 144/217; 269/305, 319

[56] References Cited

U.S. PATENT DOCUMENTS

| | | | |
|---|---|---|---|
| 58,183 | 9/1866 | Whitlock | 144/217 X |
| 580,658 | 4/1897 | Burnham | 83/468 |
| 1,885,370 | 11/1932 | Minkow | 269/319 X |
| 3,215,017 | 11/1965 | Rutz | 83/917 X |
| 3,592,093 | 7/1971 | Cantelli | 83/917 X |
| 4,200,019 | 4/1980 | Fazis | 83/467 |
| 4,283,978 | 8/1981 | Kasai et al. | 83/917 X |

*Primary Examiner*—Frank T. Yost
*Attorney, Agent, or Firm*—Cushman, Darby & Cushman

[57] ABSTRACT

A new and unique workpiece locating device for a corner shear machine which serves for determining a required position prior to starting a shearing operation when it is to be conducted at a corner or on one side of a workpiece in the form of square or rectangular sheet material. The workpiece locating device includes a pair of symmetrically located grooves extending in a V-shaped form relative to a center line extending through the center of dies across a table and a pair of rotary stoppers displaceably mounted on said grooves so as to slide to and fro therealong. The workpiece abutment edge of the respective stoppers is adjustable within an extent of an angle of 45 degrees in both the rotational directions relative to a plane extending at a right angle to the cutting edge of the dies. Measuring scales for both corner shearing and side shearing are fixedly mounted on the table in the vicinity of the grooves and in parallel to the latter. Corner shearing is effected under a positional condition that the workpiece abutment edge of the respective stoppers is located at a right angle relative to the cutting edge of the dies, whereas side shearing is effected under a positional condition that the workpiece abutment edge of one of the stoppers is located at a position turned by an angle of 45 degrees in one direction from the former position, while the workpiece abutment edge of the other one of the stoppers is located at another position turned by an angle of 45 degrees in the opposite direction.

6 Claims, 4 Drawing Figures

WORKPIECE LOCATING DEVICE FOR A CORNER SHEAR MACHINE

BACKGROUND OF THE INVENTION

1. Field of the Invention

The present invention relates to a workpiece locating device for a corner shear machine and more particularly relates to a workpiece locating device for exactly determining a required shearing position prior to starting a shearing operation for cutting off a V-shaped notch at a corner or on a side of a workpiece in the form of a sheet material.

2. Description of the Prior Art

A conventional workpiece locating device for a corner shear machine is generally constructed such that measuring scales are fixedly mounted on a table in parallel to cutting edges of dies and stoppers are arranged slidably along T-shaped grooves on the table which serve as guiding means whereby a required shearing position is determined. As is apparent from the foregoing, the conventional workpiece locating device is simple in structure, but its application is limited only to the case where a V-shaped notch (triangular cutout) is cut off at a corner of a sheet material. Thus, the conventional workpiece locating device can not be employed for the case where shearing is effected on a side of the sheet material or on a half-worked sheet material (sheet material of which one side is bent up at a right angle or of which sides are bent up in the shape of a box). For the reason there is a necessity for preparing another type of workpiece locating device particularly designed for cutting off a V-shaped notch on the side of the sheet material.

SUMMARY OF THE INVENTION

The present invention is intended to obviate the drawback inherent to the conventional workpiece locating device as described above. To sum up the present invention consists in that a pair of symmetrically located grooves are formed on a table, extending in a V-shape relative to the center line extending toward the center of the dies across the table, and a pair rotary of stoppers are displaceably mounted so as to slide along the grooves which serve as guide means.

Measuring scales for determining a required shearing position when conducting a corner shearing operation as well as those for determining a required position when conducting a side shearing operation are fixedly mounted on the table in the vicinity of the grooves and in parallel to the same. Thus, the calibrated lines on the respective measuring scales extend at a right angle relative to the cutting edge of the dies.

The stoppers are slidably mounted on the grooves and they are rotary within an extend of an angle of 45 degrees turned in both the direction from a plane extending at a right angle relative to the cutting edges of the dies. Specifically, the workpiece abutment edge of the respective stoppers resumes a position in alignment with the plane extending at a right angle relative to the cutting edge of the die, or it resumes other position angularly displaced by an angle of 45 degrees in one direction from said position, or it resumes another position angularly displaced by an angle of 45 degrees in the opposite direction from the same.

A corner shearing operation is conducted when the workpiece abutment edge of the stoppers resumes a position located at a right angle relative to the cutting edges of the dies, whereas a side shearing operation is conducted when the workpiece abutment edge of one of the stoppers resumes a position angularly displaced by an angle of 45 degrees in one direction from said position while the workpiece abutment edge of the other one of the stoppers resumes a position angularly displaced by an angle of 45 degrees in the opposite direction from the same.

To ensure that the effective length of the workpiece abutment edge of the stoppers is adjustable an adjust block is removably mounted on the stopper so that it slides along the workpiece abutment edge with the aid of a slot formed therein to serve as guiding means.

Thus, it is an object of the present invention to provide a workpiece locating device for a corner shear machine which determines a required shearing position not only when cutting off a V-shaped notch at a corner of a sheet material but also when cutting off it on a side of the same.

It is other object of the present invention to provide a workpiece locating device which is easy to determine the required shearing position within a short period of time.

It is another object of the present invention to provide a workpiece locating device for a corner shear machine which can be employed for shearing not only a regular flat sheet material but also a sheet material to which metal working is partially or locally imparted.

It is still another object of the present invention to provide a workpiece locating device for a corner shear machine which is easily operated by anyone without any necessity for a high skill.

Other objects and advantageous features of the present invention will be apparent from the reading of the following description made in connection with the accompanying drawings.

BRIEF DESCRIPTION OF THE ACCOMPANYING DRAWINGS

Now the present invention will be described in more details with reference to the accompanying drawings which illustrate a preferred embodiment of the invention in which.

DETAILED DESCRIPTION OF THE PREFERRED EMBODIMENT

Figure 1:
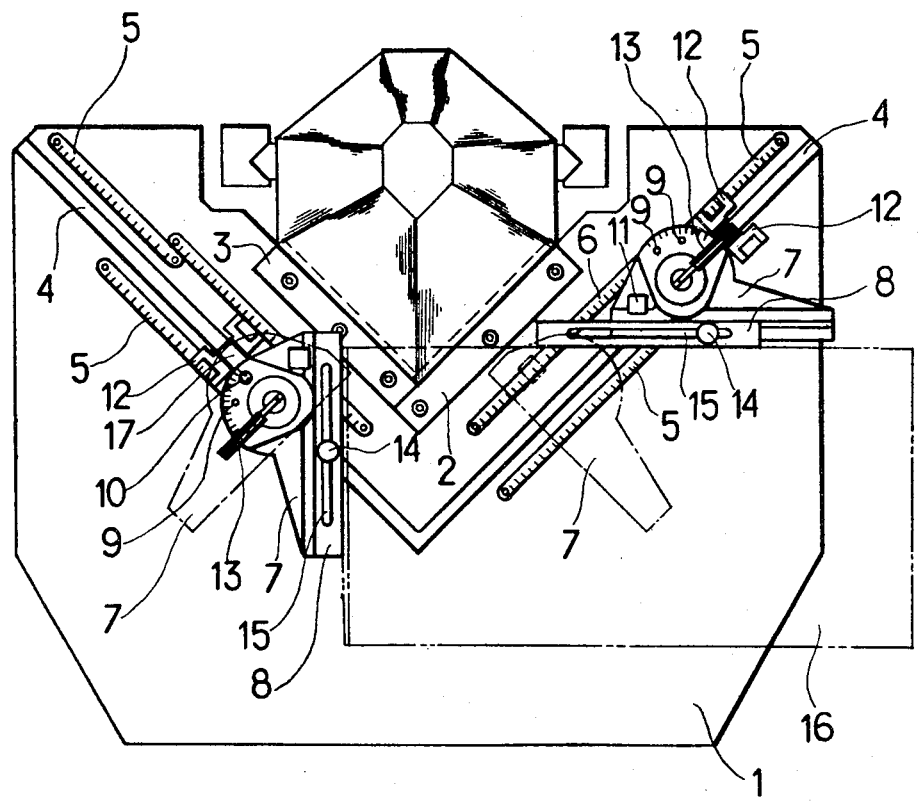
FIG. 1 is a plan view of a workpiece locating device for a corner shear machine in accordance with a preferred embodiment of the present invention, wherein the device is shown in a position where a workpiece in the form of a sheet material is located for cutting off a V-shaped notch along one side, said sheet material being represented chain lines.
Figure 2:
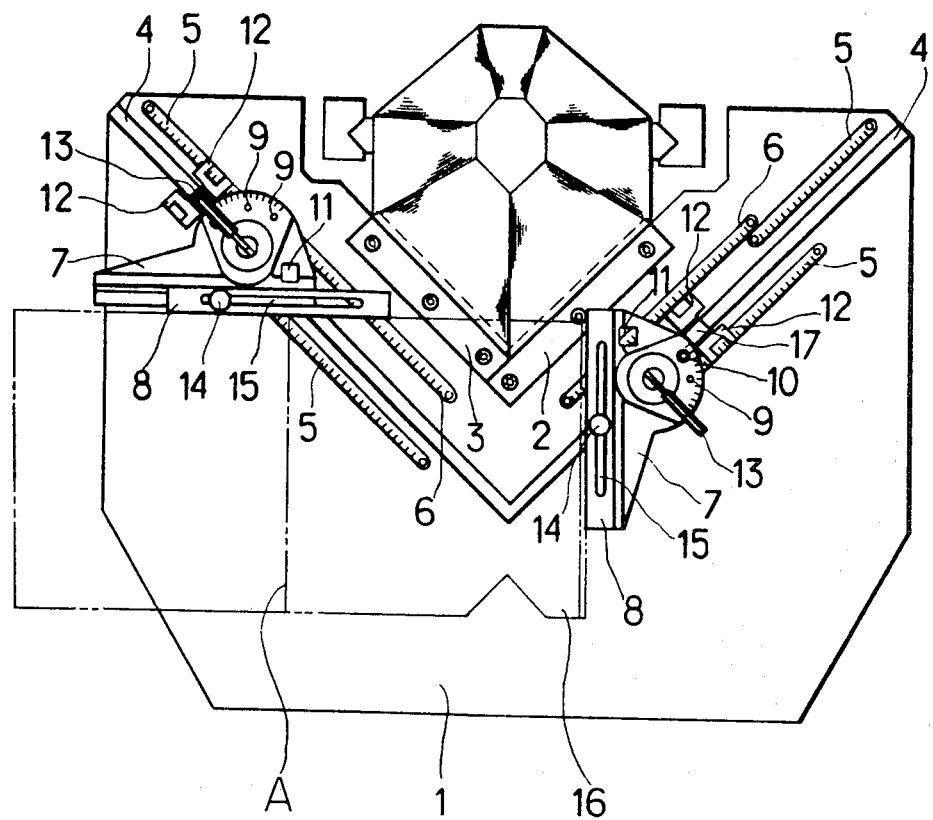
FIG. 2 is another plan view of the workpiece locating device in FIG. 1, wherein the device is shown in a position where the workpiece is located for cutting off a V-shaped notch along the opposite side.
Figure 3:
FIG. 3 is a side view of the workpiece of which right side is bent up at a right angle relative to the base plane.
Figure 4:
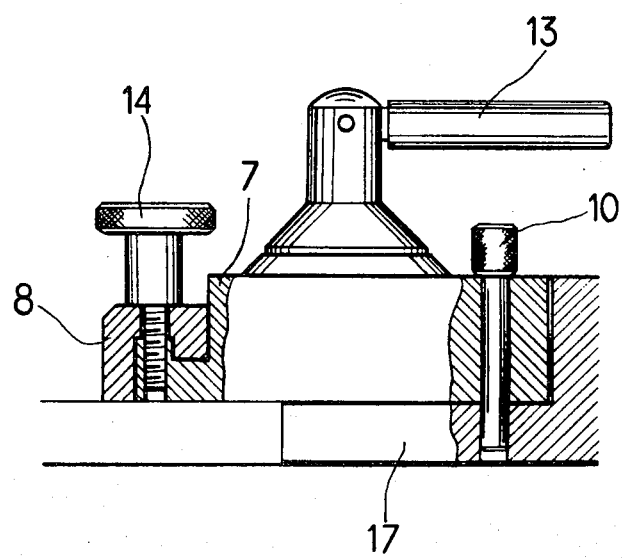
FIG. 4 is a partially sectioned side view of a stopper, shown in a scale larger than FIGS. 1 to 3.

As is best seen from FIGS. 1 and 2, a pair of oppositely located grooves 4 are provided on a table 1, extending in parallel to dies 2 and 3 which are fixedly secured onto the table 1 at a right angle relative to one another. Further, pairs of oppositely located side shearing scales 5 and a pair of oppositely located corner shearing scales 6 are fixedly mounted on the table 1, extending in parallel to the corresponding grooves 4. A stopper 7 is slidably arranged along the respective grooves 4. As described in a greater detail later, said stopper 7 is rotary and includes an adjust block 8 which is slidably mounted along the workpiece abutment edge of the stopper 7. It will be readily understood from FIG. 4 that the adjust block 8 is slidably disposed on the stopper 7. It should be noted that the respective scales 5 and 6 include a number of calibrated lines extending at a right angle relative to the longitudinal direction thereof.

In the drawing reference numeral 9 designates a drilled hole on the upper surface of the stopper 7, through which a lock pin 10 is inserted. The three drilled holes 9 are spaced from one another by 45 degrees.

Further, in the drawings reference numeral 11 designates a cursor plate fixedly mounted on the stopper for the purpose of reading the calibrated lines on the corner shearing scale 6, reference numeral 12 does a cursor plate arranged on the oppsite sides of a slider 17 for the purpose of reading the calibrated lines on the side shearing scale 5, reference numeral 13 does a lock lever for the stopper 7, reference numeral 14 does a lock handle for the adjust block 8 and reference numeral 15 does a slot on the adjust block 8. A workpiece in the form of a sheet material of which one side is bent up at a right angle is identified by reference numeral 16 and is shown by chain lines.

The corner shearing scale 6 is calibrated in a normal manner, whereas the side shearing scale 5 is calibrated in such a different manner that one calibration is dimensioned 1.4142 mm to nominally read 1 mm. This is because there is a necessity for reading in normal mm unit the displacement of the stopper 7 on the groove 4 extending at an angle of 45 degrees relative to the center line extending across the table toward the ram by means of the side shearing scale 5 of which calibrated lines extend at a right angle relative to the cutting edge of the die.

Next, operation of the workpiece locating device of the invention constructed in the above-mentioned manner will be described below.

When a shearing operation is to be conducted at the corner of the sheet material, the stopper 7 is located such that the adjust block 8 on the stopper 7 extends at a right angle relative to the cutting edge of the die, as illustrated by phantom lines in FIG. 1. Then, the stopper 7 is caused to slide along the groove 4, reading the calibrated lines on the corner shearing scales 6 until the required shearing position is determined. Then, the lock lever 13 is turned for the purpose of firmly setting the shearing position. Now the punch is ready for shearing a V-shaped notch at the corner of the sheet material in cooperation with the dies in the conventional manner.

Next, when a shearing operation is to be conducted on the one side of the sheet material, the stopper 7 is located such that the adjust block 8 on the stopper 7 extends at an angle of 45 degrees relative to the cutting edge of the die by turning the whole stopper 7, as illustrated by real lines in FIG. 1, and then the lock pin 10 is inserted into one of the drilled holes 9. Then, the stopper 7 is caused to slide along the groove 4, reading the calibrated lines on the side shearing scale 5 with the aid of the cursor 12 until the required shearing position is determined (it should be noted that one calibration on the side shearing scale 5 is dimensioned 1.4142 mm). After completion of the locating of the stopper 7 the lock lever is rotated for the purpose of fixedly setting the required shearing position. Now the punch is ready for shearing a V-shaped notch on the one side of the sheet material.

It should be noted that the workpiece locating device of the invention makes it possible to conduct a shearing operation on the opposite side of the sheet material with the one side bent up at a right angle in addition to the above-mentioned shearing operation.

In case of a normal flat sheet material a shearing operation can be conducted on the opposite side thereof merely by turning it over, but in case of a sheet material of which one side is bent up at a right angle or a sheet material of which sides are bent in the shape of a box it is impossible to effect not only the locating of the workpiece but also the above shearing operation on the opposite side thereof when it is turned over, because a hollow space is formed by a clearance equivalent to the length of the bent portion of the sheet material between the sheet material and the table. However, the workpiece locating device of the invention makes it possible to shear a V-shaped notch at the predetermined position on the opposite side of the sheet material by changing the relative position of both the stoppers 7 from that as illustrated by real lines in FIG. 1 to that as illustrated by real lines in FIG. 2 with the sheet material rotated by 180 degrees, because the grooves 4 and the scales 5 and 6 are symmetrically arranged on the table.

Another advantageous feature of the workpiece locating device in accordance with the invention is that a sheet material having a shorter width as illustratged by a phantom line A in FIG. 2 can be worked by properly displacing the adjust block 8 along the workpiece abutment edge of the stopper 7.

As described above, it is ensured that the workpiece locating device of the invention makes it possible to shear a right-angled V-shaped notch not only at the corner of the workpiece but also on the side thereof and moreover to shear a V-shaped notch on the opposite side of the workpiece of which one side is bent up or of which sides are bent up in the shape of a box. Further, it should be noted that a sheet material having a shorter width can be sheared by means of the workpiece locating device of the invention without any particular difficulty.

What is claimed is:

1. A workpiece locating device for a corner shear machine by which a V-shaped notch is sheared in a predetermined position at a corner or on one side of a workpiece in the form of a square or rectangular sheet material, wherein the device comprises a pair of grooves formed in parallel to the cutting edges of the dies fixedly secured onto a table and extending at a right angle relative to one another, said grooves extending symmetrically relative to the dies, a pair of corner shearing scales fixedly mounted on the table in the vicinity of the grooves and in parallel to the latter, said corner shearing scales including a number of calibrated lines extending at a right angle relative to the cutting edges of the dies and being arranged symmetrically relative to the dies, pairs of side shearing scales fixedly mounted on the table in the vicinity of the grooves and in parallel to the latter, said side shearing scales including a number of calibrated lines extending at a right angle relative to the cutting edges of the dies and being arranged symmetrically relative to the dies, and a pair of rotary stoppers mounted slidably along the grooves.

2. A workpiece locating device for a corner shear machine, as defined in claim 1 wherein said corner shearing scales are calibrated such that one calibration is dimensioned 1 mm to nominally read 1 mm, while said side shearing scales are calibrated such that one calibration is dimensioned 1.4142 mm to nominally read 1 mm.

3. A workpiece locating device for a corner shearing machine as defined in claim 1, wherein said stoppers include a workpiece abutment edge respectively which is rotary by an angle of 45 degrees in both the directions relative to a plane extending at a right angle to the cutting edge of the die so that said workpiece abutment edge resumes a position located at a right angle relative to the cutting edge of the die, other position angularly displaced by an angle of 45 degrees in one direction from said position, or another position angularly displaced by an angle of 45 degrees in the opposite direction from said position and the respective stoppers are locked in any one of said three positions.

4. A workpiece locating device for a corner shearing machine as defined in claim 1, wherein a corner shearing operation is conducted with the workpiece abutment edge of the stoppers located at a right angle relative to the cutting edge of the dies.

5. A workpiece locating device for a corner shearing machine as defined in claim 1, wherein a side shearing operation is conducted with the workpiece abutment edge of one of the stoppers located at a position turned by an angle of 45 degrees in one direction relative to a plane extending at a right angle to the cutting edge of the die as well as with the workpiece abutment edge of other of the stoppers located at a position turned by an angle of 45 degrees in the opposite direction relative to said plane.

6. A workpiece locating device for a corner shear machine as defined in claim 1, wherein the respective stoppers include an adjust block slidably mounted on the workpiece abutment edge thereof, said adjust block being formed with a slot so as to ensure that it slides along the workpiece abutment edge.

* * * * *